(12) United States Patent
Boyce et al.

(10) Patent No.: US 10,034,009 B2
(45) Date of Patent: Jul. 24, 2018

(54) HIGH LAYER SYNTAX FOR TEMPORAL SCALABILITY

(75) Inventors: Jill Boyce, Manalapan, NJ (US); Danny Hong, New York, NY (US)

(73) Assignee: Vidyo, Inc., Hackensack, NJ (US)

( * ) Notice: Subject to any disclaimer, the term of this patent is extended or adjusted under 35 U.S.C. 154(b) by 1352 days.

(21) Appl. No.: 13/343,266

(22) Filed: Jan. 4, 2012

(65) Prior Publication Data

US 2012/0183076 A1    Jul. 19, 2012

Related U.S. Application Data

(60) Provisional application No. 61/432,860, filed on Jan. 14, 2011.

(51) Int. Cl.
| | |
|---|---|
| *H04N 7/26* | (2006.01) |
| *H04N 19/31* | (2014.01) |
| *H04N 21/43* | (2011.01) |
| *H04N 19/105* | (2014.01) |
| *H04N 19/70* | (2014.01) |
| *H04N 19/172* | (2014.01) |
| *H04N 19/187* | (2014.01) |

(52) U.S. Cl.
CPC ......... *H04N 19/31* (2014.11); *H04N 19/105* (2014.11); *H04N 19/172* (2014.11); *H04N 19/187* (2014.11); *H04N 19/70* (2014.11); *H04N 21/4305* (2013.01)

(58) Field of Classification Search
CPC .. H04N 7/50; H04N 7/26244; H04N 7/26335; H04N 7/267941; H04N 21/4305
See application file for complete search history.

(56) References Cited

U.S. PATENT DOCUMENTS

| | | |
|---|---|---|
| 7,505,590 B1 | 3/2009 | Apostolopoulos |
| 8,582,644 B2 | 11/2013 | Lu et al. |
| 2007/0086521 A1 | 4/2007 | Wang et al. |
| 2008/0253467 A1 | 10/2008 | Wang et al. |
| 2009/0003439 A1* | 1/2009 | Wang et al. ............. 375/240.08 |
| 2009/0116562 A1* | 5/2009 | Eleftheriadis ...... H04N 21/2662 375/240.26 |

(Continued)

FOREIGN PATENT DOCUMENTS

| | | |
|---|---|---|
| JP | 2009-507450 | 2/2009 |
| JP | 2009-512306 | 3/2009 |

(Continued)

OTHER PUBLICATIONS

Eleftheriadis, "Clarification on the Temporal Nesting of Temporal Levels", Joint Video Team (JVT) of ISO/IEC MPEG & ITU-T VCEG (JVT-U085), 6 pages, 21$^{st}$ Meeting: Hangzhou, China, Oct. 20-27, 2006.

(Continued)

*Primary Examiner* — Shawn An
(74) *Attorney, Agent, or Firm* — Baker Botts, LLP

(57) ABSTRACT

Disclosed are techniques for temporal scalable video coding. By including a temporal_switching_point_flag and/or a temporal_nesting_flag into a normative part of the scalable bitstream, reference picture management in decoder can be simplified, and media-aware network elements and decoder can easily identify those pictures from which onward a higher temporal layer can be added.

2 Claims, 9 Drawing Sheets

(56) References Cited

U.S. PATENT DOCUMENTS

2010/0098154 A1  4/2010  Lou et al.

FOREIGN PATENT DOCUMENTS

| JP | 2009-512307 | 3/2009 |
| JP | 2010-507346 | 3/2010 |
| JP | 2010-524394 | 7/2010 |
| WO | WO 2007/042914 | 4/2007 |
| WO | WO 2007/042916 | 4/2007 |
| WO | WO 2007/075196 | 7/2007 |
| WO | WO 2008/048886 | 4/2008 |
| WO | WO 2008/127536 | 10/2008 |
| WO | WO 2010/014123 A1 | 2/2010 |

OTHER PUBLICATIONS

Wang et al., "SVC Temporal Layer Switching Points", Joint Video Team (JVT) of ISO/IEC MPEG & ITU-T VCEG (JVT-X032r2) 4 pages, 24th Meeting: Geneva, CH, Jun. 29-Jul. 5, 2007.

International Search Report and Written Opinion for PCT/US2012/020158, dated 3/21/20102.

U.S. Appl. No. 13/350,239, dated Jul. 18, 2014 Non-Final Office Action.

"Advanced video coding for generic audiovisual services", Mar. 2010, available from ther International Telecommunication Union ("ITU"), Place de Nations, CH-1211 Geneva 20, Switzerland or http://www.itu.int/rec/T-Rec-H.264.

"Information technology—Generic coding of moving pictures and associated audio information", Feb. 2000, available from http://www.itu.int/rec/T-Rec-H.262.

Tuorapis et al., "H.264/14496-10 AVC Reference Software Manual", (revised for JM17.1) JVT-AE010 revised, JVT-Manaul, London, UK, Jun. 2000, available from http://wftp.itu.int/av-arch/jvt-site/2009_06_London/JVT-AE010.zip.

Bross et al., "WD4: working Draft 4 of High-Efficiency Video Coding", available from http://wftp3.itu.int/av-arch/jetvc-site/2011_07_F_Torino, Jul. 2000.

U.S. Appl. No. 13/350,239, filed Oct. 17, 2014 Final Office Action.

U.S. Appl. No. 13/350,239, filed Jan. 13, 2012.

JP Notice of Allowance dated Apr. 20, 2015 in JP Patent Application No. 2013-549439.

U.S. Appl. No. 14/755,759 (US 2015/0304669), filed Jun. 30, 2015 (Oct. 22, 2015).

U.S. Appl. No. 13/350,239, dated Dec. 4, 2014 Applicant Initiated Interview Summary.

U.S. Appl. No. 13/350,239, dated Dec. 17, 2014 Amendment and Request for Continued Examination (RCE).

U.S. Appl. No. 13/350,239, dated Feb. 23, 2015 Non-Final Office Action.

U.S. Appl. No. 13/350,239, dated Apr. 6, 2015 Applicant Initiated Interview Summary.

U.S. Appl. No. 13/350,239, dated Apr. 7, 2015 Response to Non-Final Office Action.

U.S. Appl. No. 13/350,239, dated May 15, 2015 Notice of Allowance.

U.S. Appl. No. 13/350,239, dated Jun. 30, 2015 Issue Fee Payment.

U.S. Appl. No. 13/350,239, dated Jul. 17, 2015 Notice of Allowance.

EP Extended Search Report dated Dec. 23, 2015 in EP Application No. 12734149.3.

Wang, et al., "System and Transport Interface of SVC", IEEE Transactions on Circuits and Systems for Video Technology, IEEE Service Center, Piscataway, NJ, US, vol. 17, No. 9, Sep. 1, 2007 (Sep. 1, 2007), pp. 1149-1163.

U.S. Appl. No. 14/755,759, dated Mar. 24, 2016 Issue Fee Payment.

U.S. Appl. No. 14/755,759, dated Mar. 23, 2016 Issue Fee Payment.

U.S. Appl. No. 14/755,759, dated Mar. 21, 2016 Notice of Allowance.

U.S. Appl. No. 14/755,759, dated Feb. 19, 2016 Response after Final Action.

U.S. Appl. No. 14/755,759, dated Feb. 4, 2016 Terminal Disclaimer Review Decision.

U.S. Appl. No. 14/755,759, dated Jan. 11, 2016 Final Office Action.

U.S. Appl. No. 14/755,759, dated Oct. 5, 2015 Response to Non-Final Office Action.

U.S. Appl. No. 14/755,759, dated Oct. 5, 2015 Terminal Disclaimer Filed.

U.S. Appl. No. 14/755,759, dated Aug. 28, 2015 Non-Final Office Action.

\* cited by examiner

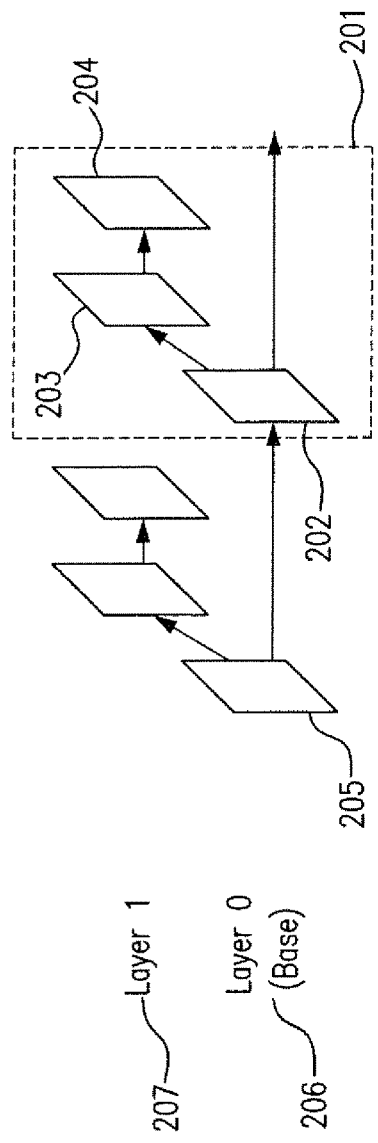
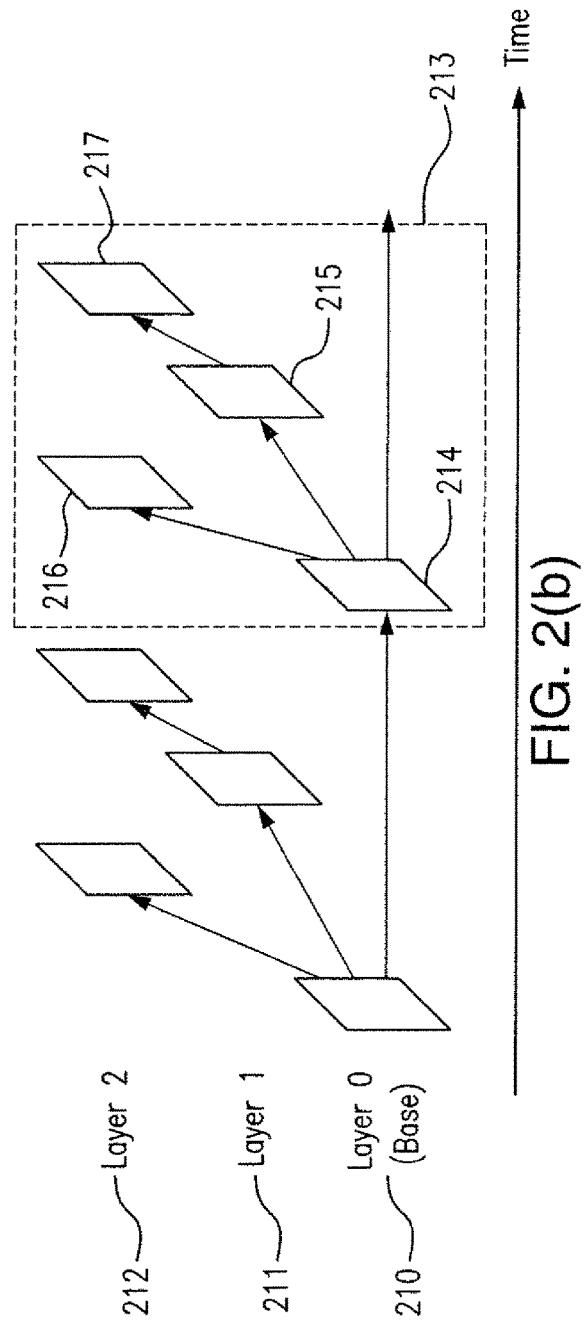
FIG. 2(a)
FIG. 2(b)

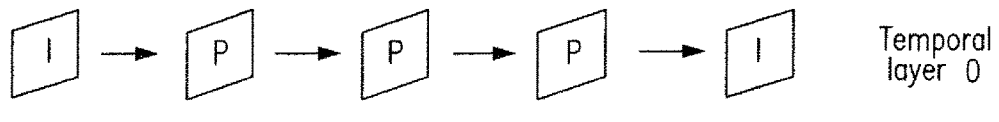
FIG. 3(a)  IPPP picture coding structure
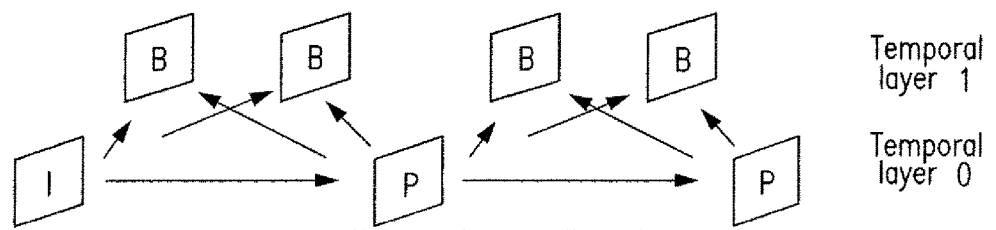
FIG. 3(b)  IBBP picture coding structure
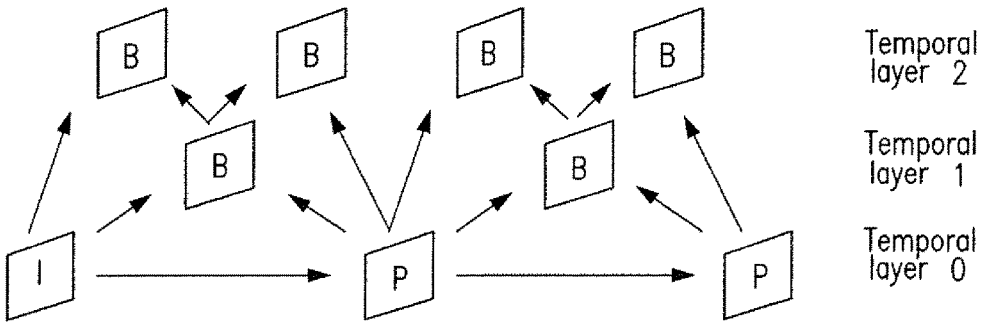
FIG. 3(c)  Hierarchical B picture coding structure
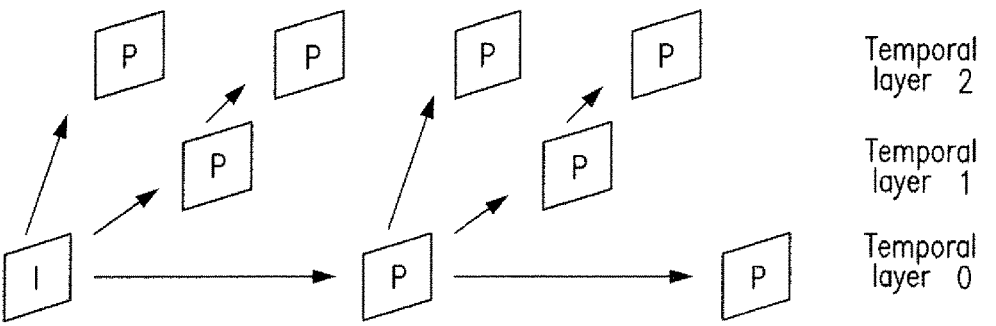
FIG. 3(d)  Hierarchical P picture coding structure

600 temporal_id specifies a temporal identifier for the NAL unit.

The value of temporal_id shall be the same for all NAL units of an access unit. When an access unit contains any NAL unit with an IDR picture, temporal_id shall be equal to 0.

When the reference picture list ordering process is invoked, there shall be at least one reference frame or complementary reference field pair that is currently marked as "used for short-term reference" or "used for long-term reference". Pictures with higher values of temporal_id than the current picture cannot be used for reference, and are not included in the reference picture list. The reference picture list RefPicList0 is ordered so that short-term reference frames and short-term complementary reference field pairs have lower indices than long-term reference frames and long-term complementary reference field pairs.

The short-term reference frames and complementary reference field pairs are ordered starting with the frame or complementary field pair with the highest PicNum value and proceeding through in descending order to the frame or complementary field pair with the lowest PicNum value, excluding any frame or complementary field pair with a temporal_id value higher than that of the current picture.

The long-term reference frames and complementary reference field pairs are ordered starting with the frame or complementary field pair with the lowest LongTermPicNum value and proceeding through in ascending order to the frame or complementary field pair with the highest LongTermPicNum value, excluding any frame or complementary field pair with a temporal_id value higher than that of the current picture.

FIG. 6

700 temporal_switching_point_flag specifies if the current access point is a temporal switching point allowing the decoding of higher temporal id layers following this access unit.

If temporal_switching_point_flag is equal to 1, all pictures with higher values of temporal_id in the reference picture storage are marked as "unused for reference".

The value of temporal_switching_point_flag shall be the same for all NAL units of an access unit. When an access unit contains an IDR picture, temporal_id shall be equal to 0.

If temporal_id_nesting_flag is equal to 1, temporal_switching_point_flag shall be equal to 1.

NOTE — When starting to decode a high temporal layer, availability of required reference pictures can be guaranteed immediately following an IDR, or following a picture with a lower value of temporal_id and temporal_switching_flag equal to 1.

FIG. 7

800 temporal_id_nesting_flag specifies whether inter prediction is additionally restricted for the target access unit set. Dependent on temporal_id_nesting_flag, the following applies.

—If temporal_id_nesting_flag is equal to 0, additional constraints may not be obeyed.

—Otherwise (temporal_id_nesting_flag is equal to 1), the following constraint shall be obeyed for layer representations with any combination of dependency_id and quality_id values present in the target access unit set.

For each access unit auA with temporal_id equal to tIdA, an access unit auB with temporal_id equal to tIdB and tIdB less than or equal to tIdA shall not be referenced by inter prediction when there exists an access unit auC with temporal_id equal to tIdC and tIdC less than tIdB, which follows the access unit auB and precedes the access unit auA in decoding order.

NOTE 2 — The syntax element temporal_id_nesting_flag is used to indicate that temporal up-switching, i.e. switching from decoding of up to a specific temporal_id tIdN to decoding up to a temporal_id tIdM > tIdN, is always possible.

FIG. 8

HIGH LAYER SYNTAX FOR TEMPORAL SCALABILITY

This application claims priority to U.S. Ser. No. 61/432,860, filed Jan. 14, 2011, titled "High Layer Syntax for Temporal Scalability," the disclosure of which is hereby incorporated by reference in its entirety.

FIELD

This application relates to video compression using temporal scalability, and more specifically to techniques enabling a video decoder or a media aware network element to identify non base-layer pictures, or parts of non-base layer pictures, required for prediction, thereby allowing for efficient bitstream pruning.

BACKGROUND

Commercial video compression techniques can use video coding standards to allow for cross-vendor interoperability. The present disclosure can be used with such a video coding standard, specifically ITU-T Rec. H.264, "Advanced video coding for generic audiovisual services", 03/2010, available from the International Telecommunication Union ("ITU"), Place de Nations, CH-1211 Geneva 20, Switzerland or http://www.itu.int/rec/T-REC-H.264, and incorporated herein by reference in its entirety.

H.264 allows for temporal scalability through a technique known as reference picture selection. Reference picture selection can allow, with a few limitations (such as: no references to pictures decoded before (in decoding order) the latest IDR picture), at the time of reconstruction of a given picture, inter picture prediction from any reference picture in storage at the decoder. The number of reference pictures stored in the decoder can be limited by profiles and levels of H.264. Further, the encoder during bitstream generation can explicitly signal, for each picture, whether it should be stored as a reference picture. In the absence of explicit signaling, some pictures are also stored implicitly. The combination of explicit signaling and implicit storage can allow for flexibility of reference picture management at low bitrate overhead.

In practice, however, certain H.264 encoders create bitstreams in which the referencing relationship of coded pictures follow certain "patterns". One crude form of those patterns were known as Group Of Pictures, or GOPs, as known from, for example, ITU-T Rec. H.262 "Information technology—Generic coding of moving pictures and associated audio information: Video", 02/2000, available from http://www.itu.int/rec/T-REC-H.262, which is also known as MPEG-2 video, and incorporated herein by reference. FIG. 2 shows two examples of patterns implementable with H.264; a more detailed description is provided later.

Within a pattern, the decoding of certain pictures can be more relevant than the decoding of others, both from a bitstream compliance, and a user experience perspective. For example, the non-availability for decoding of an IDR picture—which is in some cases the first picture of a pattern—can have negative consequences for the decoding of the rest of the pattern. On the other hand, the non-availability of a picture that is not used for reference only leads to the lack for presentation of that very picture, which can be perceived by the user as a temporary drop in frame rate, and can in some cases be concealed. The consequences of non-decoding of pictures other than IDR pictures and non-reference pictures can be moderate in terms of severity of consequences, as described later.

Referring to FIG. 1, shown is a simplified block diagram of an exemplary video conferencing system. An encoder (101) can produce a bitstream (102) including coded pictures with a pattern that allows, for example, for temporal scalability. Bitstream (102) is depicted as a bold line to indicate that it has a certain bitrate. The bitstream (102) can be forwarded over a network link to a media aware network element (MANE) (103). The MANE's (103) function can be to "prune" the bitstream down to a certain bitrate provided by second network link, for example by selectively removing those pictures that have the least impact on user-perceived visual quality. This is shown by the hairline line for the bitstream (104) sent from the MANE (103) to a decoder (105). The decoder (105) can receive the pruned bitstream (104) from the MANE (103), and decode and render it. By pruning only those pictures that are either not used for reference at all, or used for reference only by a subset of the remaining pictures of the pattern (which advantageously are also removed), the visual quality can be kept high even considering the reduction of bitrate.

Bitstream pruning in the aforementioned sense is an operation that can be processed in the compressed domain. In contrast to transcoding (which involves at least partial bitstream reconstructions and encoding), bitstream pruning can be a computationally lightweight and virtually delay-neutral operation.

Bitstream pruning can occur in all of encoder (101), MANE (103), and decoder (105). The key use case for MANE (103) based pruning has already been described. In a decoder (105), pruning can be sensible when computational resources are not available to decode all layers received in bitstream (104)—which can, for example, be the case when there is no call control protocol in which a decoder (105) can advise a MANE (103) or encoder (101) of its capabilities. Broadcast transmissions of multiple layers are one practical scenario. Bitstream pruning in the encoder (101) can occur, for example, when the signal processing entities of the encoder (101) are incapable of adapting to an network bitrate—that is: always encode a high bitrate with several layers, as dictated, for example, by an inflexible hardware architecture, but the network bitrate available for bitstream (102) changes to a value lower than required to transport all the bits, and the transport part of the encoder (101) becomes aware of this situation.

Even assuming that an encoder uses a certain pattern, the high number of potential patterns (limited only by constraints such as the maximum number of reference pictures) can create a difficulty for an encoder, decoder, or MANE when it needs to identify those pictures it needs to skip decoding, forwarding, or otherwise handling.

When H.264 and its scalable extension Annex G were designed, this problem was to some measure addressed by certain mechanisms described below. In bitstreams compliant with H.264 a decoder or MANE can use a syntax element in the NAL unit header known as nal_ref_idc to indicate a picture not being used as a reference picture. Similarly, the nal_unit_type can indicate an IDR picture. These two signaling techniques cover the two most outlying cases: IDR pictures that, in most cases are required for the decoding of all other pictures of a pattern (highest importance), and non-reference pictures, that are not required for decoding of any other picture of the pattern (lowest importance). Both mechanisms are available with or without the use of Annex G.

The Scalable Video Coding (SVC) extension to H.264, specified in Annex G, provides further aid in identifying pictures of a pattern that can be pruned. Specifically Annex G introduces, among other things, the concept of a temporal layer. Referring to FIGS. 2a and 2b, shown are two different patterns implementing temporal scalability.

FIG. 2a shows a pattern (201) that includes three pictures (202-204). Picture (202) belongs to the base layer (206), and is predicted only from a previous base layer picture (205). Prediction relationships are shown by arrows. Two temporal enhancement layer (207) pictures (203, 204) are predicted from base layer picture (202) and from layer 1 picture (203), respectively. No base layer picture is predicted from enhancement layer pictures. Further, no prediction occurs between pictures in pattern (201), and other patterns, with the exception of the base layer prediction.

FIG. 2b shows a pattern using three temporal layers: base layer (210), and a first (211) and second (212) temporal enhancement layer. Pattern (213) includes four pictures, of which picture (214) is a base layer picture, picture (215) belongs to the first enhancement layer (211), and pictures (216) and (217) belong to the second enhancement layer (212).

The prediction relationships shown in FIGS. 2a and 2b are those normally associated with predicted (P-) pictures, in contrast to intra (I-) pictures or bi-predicted (B-) pictures. Further, no multi-prediction (in the sense that different blocks of a picture can have different temporal prediction relationships) is shown in the FIGs. All above options exists in at least some profiles of H.264. For the description below, sometimes those features are omitted so to not to obscure the more relevant aspects of the present disclosure. A person skilled in the art is able to generalize to the description to different picture types and multi-prediction.

According to H.264 Annex G, there is a temporal_id field in the NAL unit header extension, which is present only for enhancement layer NAL units compliant with Annex G. The purpose of the temporal_id field is to indicate the temporal layer to which the NAL unit belongs. The presence of this information is required for the bitstream to be compliant, but it should not have any direct impact on decoding process. In other words, at least NAL units belonging to an enhancement layer have information included that signals to the decoder the temporal layer the picture belongs to.

The SVC extension further includes a Scalability Information SEI message. The Scalability information SEI message includes information about the scalability structure of the bitstream, which can also be viewed as a the description of a pattern. The Scalability Information SEI message can be used to indicate, among other things, dependencies between temporal layers, which are defined by the temporal_id syntax element described above. In other words, by receiving and interpreting the Scalability Information SEI message, a decoder can learn how many temporal layers it can expect in the scalable bitstream.

This provides for information that can be useful, but is not strictly required, for the decoding process (but may be critical for other mechanisms not defined in H.264, such as rendering, bitstream pruning, selective decoding, and so forth).

The Scalability Information SEI message further includes a temporal_id_nesting_flag. informally put, the temporal_id nesting_flag, when set, indicates that there is no prediction relationship between pictures of a higher different layer "across" a picture of a lower temporal layer. For the full definition it is referred to H.264 Annex G. The patterns of FIG. 2a and FIG. 2b fulfill this condition, as do all four patterns (also known as coding structures) of FIG. 3a-d. FIG. 3a shows a traditional IPPP coding structure, with only a single temporal layer. Since there are no temporal layers, the value of temporal id_nesting_flag is irrelevant. FIG. 3b depicts a IBBP structure as commonly used in MPEG-2 based broadcast environments. The pictures of the temporal enhancement layer I (B pictures) are using only the I pictures and P pictures of the base layer for reference. FIG. 3c shows a three layer coding structure using B pictures for the enhancement layers. Such a coding structure is implementable using H.264. FIG. 3d shows a hierarchical three layer P picture based coding structure as used in some video conferencing systems.

Encoders, decoders and MANEs can use the information in the Scalability information SEI message to determine the presence of temporal layers in the bitstream, and to determine to what extent those layers are properly "nested" in each other, in that there is no picture of a higher layer is used as a reference by a picture of a lower layer. This information can be used for bitstream pruning without deep analysis of the bitstream. For example, if the temporal_id_nesting_flag is set, and the Scalability Information SEI indicates that temporal_id=2 is the highest temporal layer, a MANE or a decoder can safely remove from a pattern all NAL units with temporal_id equal to 2 without breaking any prediction in layers 0 and 1, or it can remove all NAL units with temporal_id 2 or 1, without breaking any prediction in layer 0.

The SVC extension further provides a tl_switching_point SET message, with a delta_frame_num syntax element, to provide information about the relative position in frames when a switching point will be present. If the SEI message is used, the bitstream is restricted such that a particular temporal layer may not use any previously coded higher temporal layer for decoding.

The presence of the information in this SET message can enable the decoder to switch how many temporal layers to decode, in particular to begin decoding additional temporal layers at switching points.

The aforementioned mechanisms allow for efficient bitstream pruning of higher temporal layers, and layer switching between temporal layers if, and only if, the Scalability information and tl_switching_point SET messages are available in all MANEs involved in the transmission and/or pruning of the bitstream, and at the decoder. However, SEI message NAL units have the nal_ref_idc syntax element set to 0, indicating that a MANE or a decoder can ignore such information without violating standards compliance. Accordingly, a MANE not specifically concerned with scalable bitstreams (for example because it is a legacy device that was designed before the scalable extension of H.264 was standardized), but in a need to "prune" a bitstream (for example because of insufficient bandwidth on its outgoing link) is likely to remove the SET message among with other NAL units with nal_ref_idc set to 0, such as non-reference pictures. As a result other MANEs or decoders further downstream may not easily (without deep bitstream inspection) remove temporal layers.

A MANE also may be required to maintain state, especially with respect to the content of the Scalability Information and tl_switching_point SET messages, so to make informed decisions about pruning. Establishing such state can require intercepting and interpreting all, or substantially all such SET messages. While most MANEs need to intercept and interpret parameter set information to make meaningful decisions, very few of the numerous SEI messages have any meaning to a MANE. Intercepting all SEI messages just to extract and interpret those few which are meaningful for the MANE can be an onerous and computationally expensive process.

Further, temporal scalability (in contrast to other forms of scalability) can be implemented using the pre-Annex G version of H.264 (profiles such as baseline, main, or high profile). However such profiles can lack the functionality of the aforementioned SEI messages.

Accordingly, one shortcoming of Annex G of H.264 can be that the information mentioned should be available in syntax elements less readily discarded, and less obscured by other information, than SET messages.

Currently in the process of standardization is High Efficiency Video Coding (HEVC). A working draft of HEVC can be found at (B. Bross et. al., "WD4: Working Draft 4 of High-Efficiency Video Coding", available from http://wftp3.itu.int/av-arch/jctvc-site/2011_07_F_Torino/), referred to as "WD4" henceforth, which is incorporated herein by reference. HEVC inherits many high level syntax features of H.264. It can be advantageous to the success of HEVC if the shortcomings of H.264 described above were addressed before the standard is ratified.

There is a need for techniques that allow for signaling of information related to temporal scalability in a manner that makes intentional removal of scalability information (such s an SEI message) by legacy MANEs, baseline H.264 decoders, and HEVC capable MANEs and decoders difficult or impossible without losing conformance with the video coding standard, while still maintaining overall design integrity.

SUMMARY

The disclosed subject matter provides improvements over H.264 or WD4 for the bitstream manipulation including bitstream extraction, and decoding of sequences with temporal A bitstream extractor can extract a second scalable bitstream of lower or equal bitrate by pruning one or more layers, which can be temporal layers, from a first bitstream. Bitstream extractors can reside, for example, in encoders, MANEs, and decoders.

A bitstream extractor can identify which portions of a temporally scalable video bitstream should be forwarded or pruned, such that the decoder will be able to properly decode the extracted bitstream. Parallel decoders, in which decoding of individual access units can be assigned to separate processors or cores, can benefit from knowledge of which pictures are dependent on which reference pictures.

In some embodiments, a temporal_id value is present in all NAL units carrying information belonging to a temporal enhancement layer, independently of whether the use is scalability is signaled, for example by profile, level, or similar bitstream-related properties. For optimization in non-scalable environments, the inclusion of temporal id can be signaled through appropriate fields in the NAL unit header, such as the NAL unit type. The temporal_id field can aid a bitstream extractor identifying the NAL units it needs to prune to remove a temporal layer.

In some embodiments, the temproral_id_nesting_flag is conveyed in a high level syntax structure in a normative part of the bitstream, for example the sequence parameter set. A bitstream extractor can rely on the presence of the temporal_id_nesting_flag in the normative part of the bitstream, which simplifies its implementation.

In some embodiments, the temporal_switching_point_flag is conveyed in a high level syntax structure in a normative part of the bitstream, for example a slice header.

A bitstream extractor can rely on the presence of the temporal_switching_point_flag in the normative part of the bitstream, which can simplify its implementation.

In some embodiments, an encoder or decoder can include reference picture list ordering and index assignment, which considers temporal id values of the current picture and previously coded pictures stored in the reference picture storage. Using this information, the encoder or decoder can exclude those pictures with higher temporal_id values than the current picture from the reference picture list.

In some embodiments, an encoder or decoder can include a reference picture marking process which considers a temporal_switching_point_flag.

Using the temporal_switching_point_flag can allow for flexible multi-picture prediction techniques while still enabling the adding of pictures of a higher temporal layer at certain points in the bitstream, indicated by the temporal_switching_point_flag.

In some embodiments, a MANE uses temporal_id_nesting_flag and/or temporal_switching_point_flag for temporal layer switching.

In some embodiments, a decoder uses temporal_id_nesting_flag and/or temporal_switching_point_flag to support parallel decoding.

BRIEF DESCRIPTION OF THE DRAWINGS

Further features, the nature, and various advantages of the disclosed subject matter will be more apparent from the following detailed description and the accompanying drawings in which:

FIG. 2 is a schematic illustration of two patterns with two or three layers, respectively;

FIG. 3 is a schematic illustration of four patterns with different picture types;

FIG. 6 is specification language for temporal_id formatted for inclusion in a video coding standard in accordance with an embodiment of the present invention;

FIG. 7 is specification language for temporal_switching_point_flag formatted for inclusion in a video coding standard in accordance with an embodiment of the present invention;

FIG. 8 is specification language for temporal_nesting_flag formatted for inclusion in a video coding standard in accordance with an embodiment of the present invention.

Figure 1:
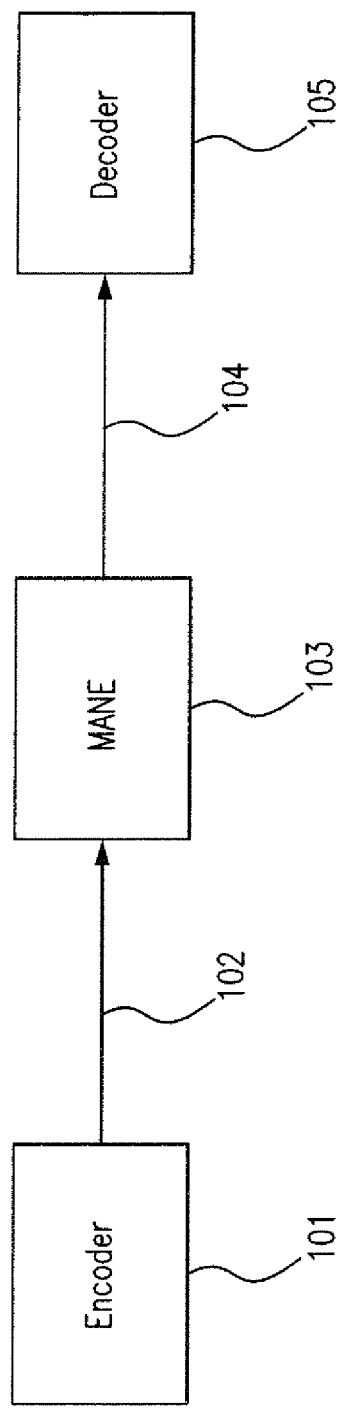
FIG. 1 is a schematic illustration of a video conference system.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

This application relates to video compression using temporal scalability, in which higher temporal levels provide higher frame rate video, and prediction from previously coded reference pictures. By a novel inclusion of a temporal_nesting_flag and a temporal_switching_point_flag in normative parts of the bitstream, a number of novel techniques related to temporal scalability are enabled.

In an embodiment, the temporal_nesting_flag syntax element is placed in a high level syntax structure, for example a parameter sets such as sequence parameter set. The term "high level syntax structure", as used in the present patent application, refers to a structure that is required for the decoding process. For example, in H.264, the picture parameter set and the sequence parameter set, as well slice headers, are all high level syntax structures. However, Supplementary Enhancement Information (SEI) messages would not constitute a high level syntax structure, because they are not required for the decoding process. Similarly, the Visual Usability Information structure would not constitute a high level syntax structure, even though it is optionally carried in the sequence parameter set, which is a high level syntax structure. The difference between the VUI and other structures located in the sequence parameter set is that the VUI information is not required for the decoding process, whereas all other information in the SPS is. Accordingly, a bitstream from which the VUI information has been removed from the sequence parameter set can be conforming to the H.264 standard.

Having the flag in the sequence parameter set ensures that an encoder, decoder, and/or those MANES that keep parameter set states, have access to its value. The semantics of a parameter set based temporal_nesting_flag can be as follows: if the temporal_nesting_flag is set to 1, when a picture with a lower temporal_id is decoded, references pictures with higher temporal_id values can no longer be used for prediction.

In the same or another embodiment, the temporal_nesting_flag applies to all temporal layers in a bitstream.

In accordance with the disclosed subject matter, a syntax and decoding process description (800) as shown in FIG. 8 can be employed to define the temporal_nesting_flag, using the conventions used in H.264, the aforementioned behavior.

When the temporal nesting flag is set to 1, according to the above description, if a lower temporal layer picture exists in a bitstream, pictures at a higher temporal layer may not predict from any picture preceding the lower temporal layer picture, which may potentially reduce coding efficiency. A mechanism would be helpful that would allow to loosen the rigid restrictions of the temporal_nesting_flag without requiring the deep bitstream inspection required to identify temporal switching points. A temporal switching point can be a picture from which onward there is no dependency through temporal prediction of pictures in the same or a higher temporal layer. To at least partly mitigate this shortcoming, in the same or another embodiment, a temporal_switching_point_flag can be used to indicate, for a picture, the presence of a temporal switching point following the picture. This allows the encoder to control the tradeoff between coding efficiency and frequency of temporal switching points, by inserting a temporal switching point (i.e. not exercising its freedom to reference previous pictures of the same or higher layer for reference) only at a frequency of the encoder's choice. In order to support the aforementioned mechanism, the temporal_switching_point_flag should reside in a normative part of the bitstream that can change from picture to picture, for example in a slice header.

In accordance with the disclosed subject matter, a syntax and decoding process description (700) as shown in FIG. 7 can be employed to define the temporal_switching_point_flag, using the conventions used in H.264 (700), the aforementioned behavior.

Placing the aforementioned flags in normative parts of the bitstream, such as parameter set or slice header, allows for a number of simplification and optimizations of temporal scalable coding, some of which are described now.

In one embodiment, in the context of H.264's reference picture management mechanisms, when the temporal_id_nesting_flag is set to 1, a decoder can mark as "unused for reference" all pictures in the reference picture list with higher temporal_id values after decoding a picture with a given temporal_id value.

In the same or another embodiment, this can result in those pictures being removed from reference picture memory, thereby creating space for additional reference pictures and allowing an encoder to use those additional reference pictures, which can aid, among other things, coding efficiency. Another advantage is that, when coding hierarchical picture structures with nesting, Memory Management Control Operation (MMCO) syntax elements may not be required in the bitstream. MMCO syntax elements do not only require bits for their representation in the bitstream (and their removal, therefore, is beneficial for coding efficiency), but have also been reported as difficult to understand and implement in some encoder and decoder architectures. A further advantage can be that, in case of temporal scalability only, the scalability information SEI message may be redundant, and, accordingly, not being sent by a good encoder implementation, which can also be good for coding efficiency.

In accordance with the disclosed subject matter, a syntax and decoding process description as shown in FIG. 6 can be employed to formally define the behavior described above, using the conventions used in H.264 (600).

Figure 4:
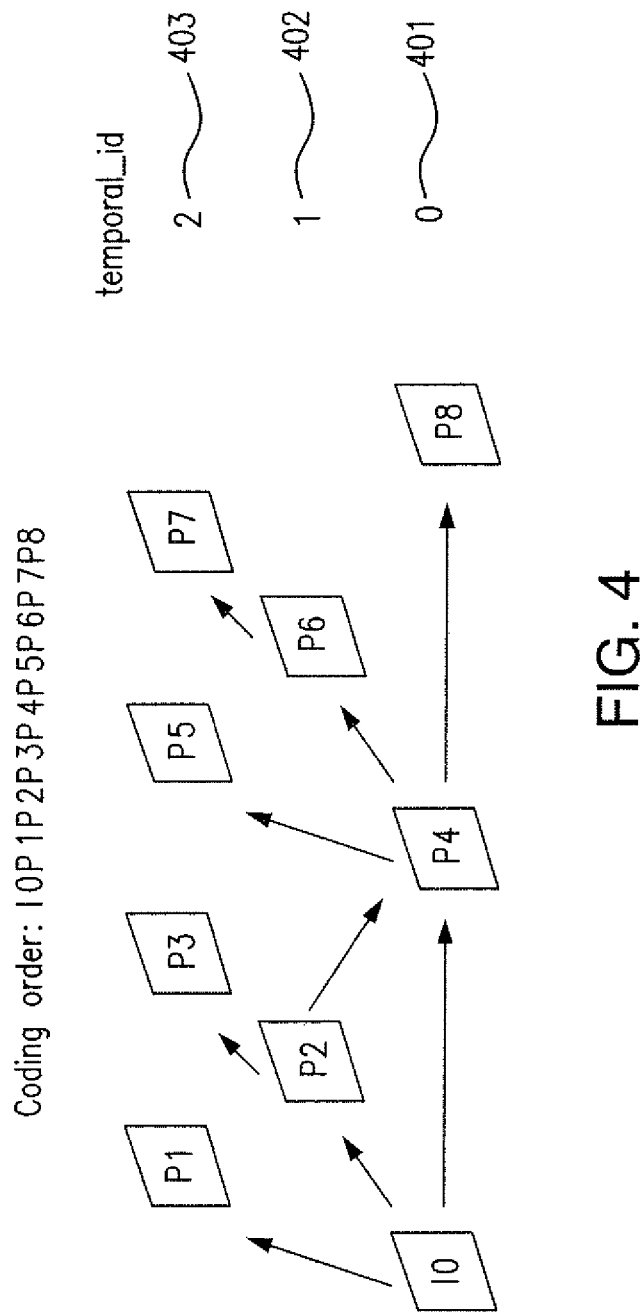
FIG. 4 is a schematic illustration of a coding structure in accordance with an embodiment of the present invention.

FIG. 4 shows an example hierarchical P picture coding structure with three temporal layers in accordance with an embodiment of the disclosed subject matter, with temporal_nesting_flag set to 1. Pictures belonging to the base layer, indicated by temporal_id 0 (401) are shown below pictures with temporal_id 1 (402). Pictures with temporal_id 2 (403), the highest enhancement temporal layer of the example, are shown above the other two layers. In this example, pictures at the highest temporal layer, layer 2 (403), P1, P3, P5 and P7, are coded as "not used for reference", indicated, for example, by values of 0 in the nal_ref_idc field of each slice belonging to the picture. Pictures at temporal layers 0 and 1 are coded as "used for reference", indicated, for example, by a value of 3 in the nal_ref_idc field of each NAL unit belonging to the picture. With the reference picture list process described above, pictures in layer 0 cannot use pictures from layer 1 as references. When coding picture P4, without the disclosed subject matter, in H.264/AVC the default reference picture list ordering process would put picture P2 first in the reference picture list, followed by I0, and an encoder would be required to use ref_pic_list_modification( ) or dec_ref_pic_marking( ) syntax in order to put I0 first in the reference picture prediction list. In accordance with the disclosed subject matter, when the reference picture list for picture P4 was formed, picture P2 would not be included in the list, because the temporal id value of 1 for picture P2 is higher than the temporal_id value of 0 for picture P4.

Figure 5A:
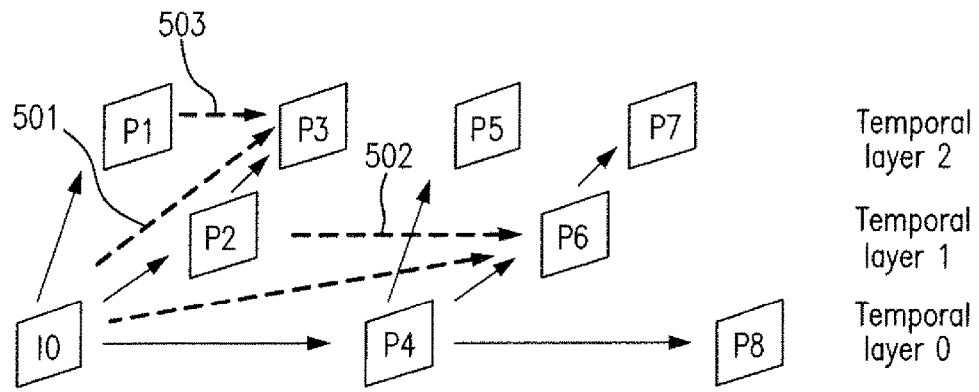
FIG. 5 is a schematic illustration of coding structures using multi-prediction in accordance with an embodiment of the present invention.
Figure 5B:
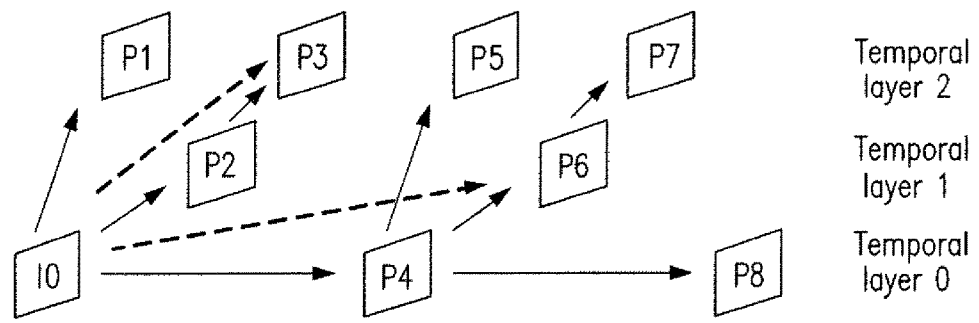
Figure 5C:
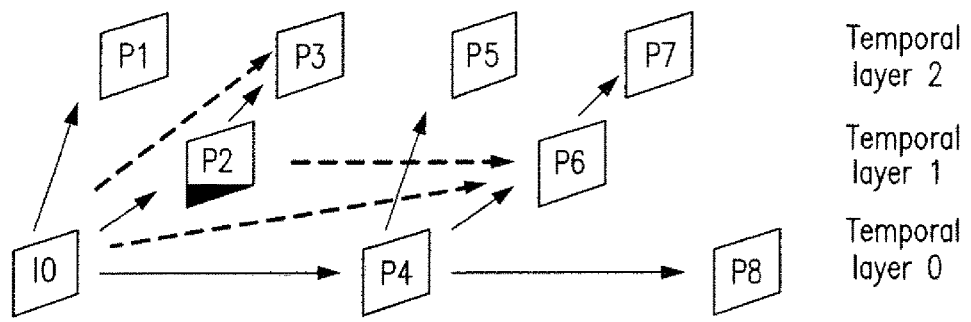

FIGS. 5a, 5b, 5c show examples of the use of the temporal_nesting_flag and temporal_switching_point_flag. For some pictures, a first predictor in a prediction list is shown with a solid arrow, and additional predictors (allowed by multiple reference picture prediction) for only pictures P3 and P6 are shown with dashed arrows. The restriction to pictures P3 and P6 is exemplary only; it is used to show multi-prediction pictures in enhancement layers 1 and 2 but should not be it is not a restriction, by the disclosed subject matter, that other pictures shown could not use multi-prediction. FIG. 5a shows an example of full flexibility of reference picture referral with temporal nesting_flag and temporal_switching_point_flag set to 0 for all pictures. FIG. 5b shows an example of temporal_nesting_flag=1, where a number of prediction options are removed. FIG. 5c, shows an example of temporal_nesting_flag=0, with a switching point (indicated by temporal_switching_flag set to 1) in picture P2.

FIG. 5a shows an example hierarchical P picture coding structure with multiple reference pictures, assuming the full flexibility offered when temporal_nesting_flag is set to 0. Picture P3 can be predicted from pictures P2, P1, or I0, and picture P6 can be predicted from P4, P2, or I0. Note that dashed arrows (501, 502, 503) indicate a prediction from a reference picture of the same or higher layer that has been decoded before the last picture of any lower layer. For example P6 is predicted (502) from P2, but P4 (which is of a lower layer) is has been decoded after P2, but before P6. This is a violation of temporal nesting, and allowed only if the temporal_nesting_flag is set to 0.

As shown in FIG. 5(b), if temporal_id_nesting_flag is equal to 1, picture P3 can be predicted from P2 or I0, but not from P1, and picture P6 can be predicted from P4 or I0, but not from P2. In other words, dashed arrows (501, 502, 503), as shown in FIG. 5a, are not available as prediction option, potentially resulting in lower coding efficiency (fewer options for the decoder), but enabling independent picture decoding patterns (picture P2 can be removed from the reference picture list as soon as picture P4 has been decoded).

Using temporal_switching_point_flag allows tuning the available temporal reference pictures on a per picture basis. Shown in FIG. 5(c) is an example, in which picture P2 has the temporal_switching_point_flag set to 1, indicated by a black mark. Since the next picture in decoding order of an equal or lower layer, P4, doesn't have the flag set, a temporal switching point from layer 1 to layer 2 is indicated, but no switching point from layer 0 to layer 1 is indicated. Accordingly, a decoder that was already decoding layers 0 and 1 could add layer 2 starting with the layer 2 coded picture following P2, namely is P3. Picture P3 could be predicted from P2 or I0, but not from P1. In other words, prediction arrow (503) is not available. The predictor list for P6 is populated by all options available in FIG. 5(a), including prediction arrow (502). Allowing P6 to be predicted from P2 with multiple reference pictures potentially improves coding efficiency.

Described above were two options available when reference picture management approximately follows the mechanisms defined in H.264.

In WD4 and proposals made towards improved reference picture management for HEVC, other options can be available. For example, flags can be received by a decoder associated with each previously coded picture in the decoder picture buffer, indicating whether or not that previously coded picture is included in the reference picture list and assigned a reference picture index.

Described now are a few practical examples of the use of the aforementioned techniques.

A MANE (103) in a system as shown in FIG. 1 can use the disclosed subject matter to improve temporal layer switching. Assume the MANE (103) is receiving a bitstream with N temporal layers, and further transmitting only the lowest M of those layers, where M<N, perhaps because of bitrate limitations on link (104) from the MANE (103) to the decoder (105). Assume the available bitrate in on link (104), enabling an additional M+1 layer to be transmitted. If the MANE (103) were to simply start transmitting the first picture it receives from the encoder (101) over link (102) from layer M+1, there is no guarantee that the decoder will be able to successfully decode the picture, as it may predict from a reference picture that is not available.

MANEs can easily parse high level information to determine the values of temporal_id_nesting_flag and temporal_switching_point_flag to enable temporal layer switching. In accordance with the disclosed subject matter, if the temporal_id_nesting_flag is equal to 1, the MANE may begin transmission of any layer M+1 access unit as indicated by a temporal_id value of M+1 that immediately follows any access unit with temporal_id value indicating layer M or lower. Because of the reference picture marking process of the disclosed subject matter, there will be no reference pictures from unavailable pictures in the reference pictures storage for following layer M+1 coded pictures.

If temporal_id_nesting_flag is equal to 0, the MANE can access the temporal_switching_point_flag, as well as the nal_unit_type for all NAL units of all received pictures. The MANE may begin transmission of any layer M+1 picture following a temporal_switching_point_flag present in any layer M or lower picture. Because of the reference picture marking process of the disclosed subject matter, there will be no reference pictures from unavailable pictures in the reference pictures storage for following layer M+1 coded pictures.

A similar operation can be performed at the decoder, to determine when decoder operation may begin. This operation can also be used for parallel decoding for decoders with multiple processors or cores, which are capable of decoding pictures in parallel on separate cores. The decoder can determine that pictures in a particular temporal layer can be decoded with reference picture prediction from only a limited set of previously coded pictures, allowing the launch of parallel decoding of the picture.

Computer System

The methods for video coding, described above, can be implemented as computer software using computer-readable instructions and physically stored in computer-readable medium. The computer software can be encoded using any suitable computer languages. The software instructions can be executed on various types of computers. For example, FIG. 9 illustrates a computer system 900 suitable for implementing embodiments of the present disclosure.

Figure 9:
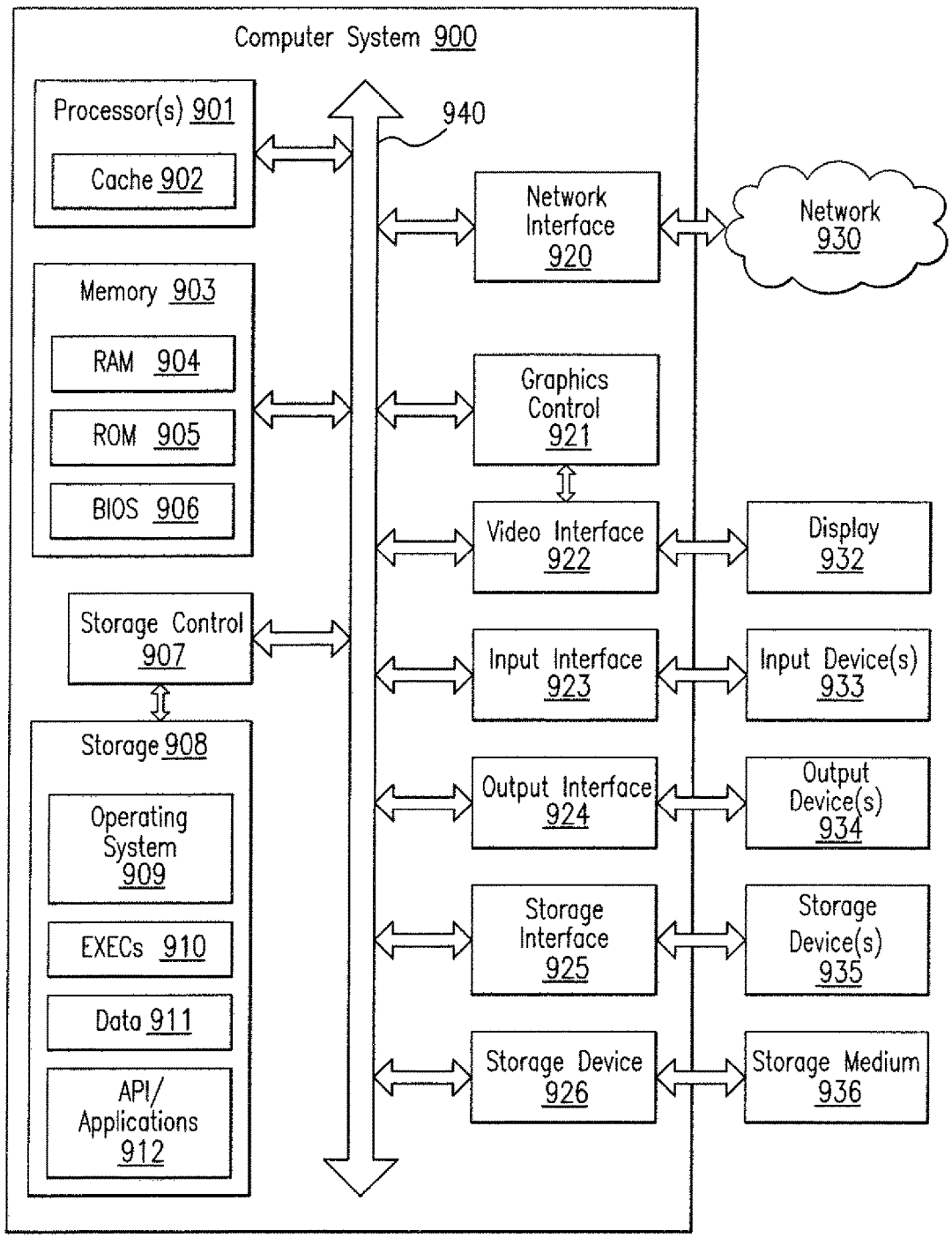
FIG. 9 is a schematic illustration of a computer system in accordance with embodiments of the present invention.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 900 can have many physical forms including an integrated circuit, a printed circuit board, a small handheld device (such as a mobile telephone or PDA), a personal computer or a super computer.

Computer system 900 includes a display 932, one or more input devices 933 (e.g., keypad, keyboard, mouse, stylus, etc.), one or more output devices 934 (e.g., speaker), one or more storage devices 935, various types of storage medium 936.

The system bus 940 link a wide variety of subsystems. As understood by those skilled in the art, a "bus" refers to a plurality of digital signal lines serving a common function. The system bus 940 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 901 (also referred to as central processing units, or CPUs) optionally contain a cache memory unit 902 for temporary local storage of instructions, data, or computer addresses. Processor(s) 901 are coupled to storage devices including memory 903. Memory 903 includes random access memory (RAM) 904 and read-only memory (ROM) 905. As is well known in the art, ROM 905 acts to transfer data and instructions uni-directionally to the processor(s) 901, and RAM 904 is used typically to transfer data and instructions in a bi-directional manner. Both of these types of memories can include any suitable of the computer-readable media described below.

A fixed storage 908 is also coupled bi-directionally to the processor(s) 901, optionally via a storage control unit 907. It provides additional data storage capacity and can also include any of the computer-readable media described below. Storage 908 can be used to store operating system 909, EXECs 910, application programs 912, data 911 and the like and is typically a secondary storage medium (such as a hard disk) that is slower than primary storage. It should be appreciated that the information retained within storage 908, can, in appropriate cases, be incorporated in standard fashion as virtual memory in memory 903.

Processor(s) 901 is also coupled to a variety of interfaces such as graphics control 921, video interface 922, input interface 923, output interface 924, storage interface 925, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 901 can be coupled to another computer or telecommunications network 930 using network interface 920. With such a network interface 920, it is contemplated that the CPU 901 might receive information from the network 930, or might output information to the network in the course of performing the above-described method. Furthermore, method embodiments of the present disclosure can execute solely upon CPU 901 or can execute over a network 930 such as the Internet in conjunction with a remote CPU 901 that shares a portion of the processing.

According to various embodiments, when in a network environment, i.e., when computer system 900 is connected to network 930, computer system 900 can communicate with other devices that are also connected to network 930. Communications can be sent to and from computer system 900 via network interface 920. For example, incoming communications, such as a request or a response from another device, in the form of one or more packets, can be received from network 930 at network interface 920 and stored in selected sections in memory 903 for processing. Outgoing communications, such as a request or a response to another device, again in the form of one or more packets, can also be stored in selected sections in memory 903 and sent out to network 930 at network interface 920. Processor(s) 901 can access these communication packets stored in memory 903 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 900 can provide functionality as a result of processor(s) 901 executing software embodied in one or more tangible, computer-readable media, such as memory 903. The software implementing various embodiments of the present disclosure can be stored in memory 903 and executed by processor(s) 901. A computer-readable medium can include one or more memory devices, according to particular needs. Memory 903 can read the software from one or more other computer-readable media, such as mass storage device(s) 935 or from one or more other sources via communication interface. The software can cause processor(s) 901 to execute particular processes or particular parts of particular processes described herein, including defining data structures stored in memory 903 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for decoding with a decoding device media encoded using scalable coding with temporal scalability at a pre-determined maximum temporal level, the method comprising:

decoding a single bit flag temporal_nesting_flag in a sequence parameter set that is indicative of a temporally nested structure of layers and pertains to all frames of a coded video sequence, decoding a coded first picture of the coded video sequence with a first layer_id;

in response to the decoded temporal_nesting_flag equal to 1, removing at least one second picture of the coded video sequence from a reference picture list maintained by the decoder, the at least one second picture in the reference picture list having a second layer_id, wherein a value of the second layer_id is higher than a value of the first layer_id and wherein the second picture is not used for a prediction of the first picture or any pictures following the first picture in decoding order;

wherein the at least one second picture of the coded video sequence would be included in the reference picture list if the decoded temporal_nesting_flag were equal to 0;

wherein the temporal_nesting_flag set to one indicates for any three frames picA, picB, picC included in the coded video sequence, that picB is not used for reference of picA:

under a first condition that picB is of a temporal level lower or equal than the temporal level of picA, and under a second condition that the temporal level of picC is lower than the temporal level of picB, and under a third condition that picC follows picB in decoding order, and under a fourth condition that picC precedes picA in decoding order; and wherein picB is not included in a reference picture list of picA.

2. The method of claim 1, wherein when the temporal_nesting_flag is equal to 0 the second picture is used for prediction of the first picture or a picture following the first picture in decoding order.

* * * * *